April 13, 1971     H. WEITZ ET AL     3,574,553
FLUID ANALYZER Filed Jan. 8, 1968     6 Sheets-Sheet 1

INVENTORS
HERBERT WEITZ
FRED REH
RODERIC SPENCER
BY Popper, Bain, + Bobis
ATTORNEYS

April 13, 1971   H. WEITZ ET AL   3,574,553
FLUID ANALYZER
Filed Jan. 8, 1968   6 Sheets-Sheet 4

INVENTORS:
HERBERT WEITZ
FRED REH
RODERIC SPENCER
BY Popper, Bain, & Bobis
ATTORNEYS

United States Patent Office 3,574,553
Patented Apr. 13, 1971

3,574,553
FLUID ANALYZER
Herbert Weitz, Scotch Plains, Roderic Spencer, Plainfield, and Fred Reh, Fanwood, N.J., assignors to Howard Precision Inc., Fanwood, N.J.
Filed Jan. 8, 1968, Ser. No. 696,215
Int. Cl. G01n 31/02, 21/26
U.S. Cl. 23—253
32 Claims

ABSTRACT OF THE DISCLOSURE

A fluid analyzer which periodically, automatically mixes a fluid sample with a test reagent, analyzes alterations in light transmission characteristics of the mixture produced thereby by means of a photo-sensitive, signal generating sensor which feeds and controls response means such as a make-up chemical feeder, an alarm or a recorder, and automatically cleanses the optical surfaces.

BACKGROUND OF THE INVENTION

The rapid expansion of the swimming pool industry has created a demand for a relatively simple, inexpensive pool water monitor which can periodically, automatically analyze the chlorine content and, if found lacking, energize a make-up chlorine feeder to return the chlorine concentration in the pool to a proper level.

While in this application, we describe specifically a swimming pool water monitor, the same apparatus may be employed to monitor a wide variety of fluids to automatically and periodically analyze the same to determine various conditions. For instance, our fluid analyzer may be employed to monitor public waterways and other bodies of water as well as industrial wastes and the like so long as photo-optical sensor means may be employed to analyze the fluid.

Specifically with respect to swimming pool monitors, the fundamental object is to determine the chlorine level in a sample of swimming pool water and, if the chlorine level is too low, add make-up chlorine automatically until the chlorine concentration within the pool has returned to an acceptable level. At present, this test is conducted by hand which is not only burdensome and time consuming but frequently produces results the accuracy of which are subject to question, or is performed automatically by a monitor which is extremely expensive and therefore, commercially feasible only for the largest public swimming pools.

The most accurate, inexpensive and easy means to determine the chlorine level in water is by use of a test reagent which in the presence of chlorine alters the light transmission characteristics of the fluid sample. Specifically, the opacity of the mixture increases and as a result the amount of light transmitted therethrough decreases in direct proportion to the amount of chlorine in the test sample. A photo-sensitive sensor may therefore, be employed to evaluate the decrease in light transmission through a given sample after the addition of the test reagent translating the decrease in light amplitude into an electrical signal which may feed and control a make-up chlorine feeder.

A photo-electrical, signal generating test cell of the character described can also be employed to evaluate the level of turbidity in a fluid sample which is frequently a measure of certain contaminants. In addition, test reagents for other chemicals or conditions are known which when mixed with a test sample will alter the light transmission characteristics thereof in proportion to the level of the particular contaminant for which the test is conducted. Such tests are particularly applicable to water pollution from industrial sources and the like.

While the test described above for determining chlorine level is accurate in and of itself, it has been found that the accuracy of such test cells progressively deteriorates as repeated tests are conducted. The deterioration of accuracy is due to the fact that the mixture of test reagent and sample deposits a light screen coating on the critical photo-optical surfaces within the test cell, specifically the lens of the light source and the lens of the photosensitive sensor. Thus, it is imperative that these deposits be removed almost after each test and certainly before the accuracy of the test cell has been impaired.

Existing photo-sensitive test cells must rely upon dismantling the cell and removal of the critical photo-optical lenses for cleansing. Obviously, this procedure cannot be reasonably conducted after each test and therefore, the accuracy of the test cell must necessarily deteriorate to some extent between each cleaning. In addition, the dismantling process is not only time consuming but creates serious problems of resealing the test cell after the fluid seals have been disturbed for dismantling purposes. This disturbed seal effect has created grave problems and has impaired the commercial feasibility of existing equipment.

In our fluid analyzer, we provide means internal to the test cell which periodically and automatically clean all critical photo-optical surfaces from within the test cell, such means being operable from without the test cell without disturbing fluid or air seals.

Therefore, it is among the objects and advantages of our invention to provide a fluid analyzer which automatically, periodically monitors a fluid by mixing a test sample thereof with a test reagent, analyzes the resultant alteration in light transmitting characteristics of the mixture by means of a signal generating photo-sensitive sensor, the signal from which feeds and controls some response means such as a make-up chemical feeder, an alarm or a recorder.

Another object of our invention is to provide a fluid analyzer as aforesaid in which the sensitivity of the sensor, the quantity of test reagent added, and the quantity of make-up chemical fed may be manually varied by the operator in accordance with the demands of existing conditions.

A further object of our invention is to provide a fluid analyzer as aforesaid which can actuate remote auxiliary equipment such as remote make-up chemical feeders or pool filters and which is provided with means for manually initiating a test cycle at the will of the operator.

The following United States Letters Patents relate broadly to our invention but do not anticipate the claims annexed hereto: 1,937,721, 1,937,722, 1,978,589, 2,207,097, 2,361,235, 3,168,218, 3,251,999.

SUMMARY OF INVENTION

A fluid analyzer comprising a photo-electrical test cell defined by a chamber for the passage of fluid between a light source and a signal generating photo-electrical sensor positioned in light intercepting relation to the light source; the sensor generating a signal response to variations in the optical characteristics of the fluid between it and the light source; means for introducing a fluid test sample into the test cell; means for mixing a test reagent with the test sample in the cell; means for sampling a readout signal from the sensor after mixture of the test sample with the test reagent in the test cell; response means operatively connected to and controlled by the readout signal from the sensor; cleansing means within the test cell engageable with all critical photo-optical surfaces and operable from without the test cell; and means for discharging the mixed fluid test sample and test reagent from the test cell after sensor signal readout.

PREFERRED EMBODIMENT OF INVENTION

The objects and advantages aforesaid as well as other objects and advantages may be achieved by our fluid analyzer, a preferred embodiment of which is illustrated in the drawings, in which.

Figure 1:
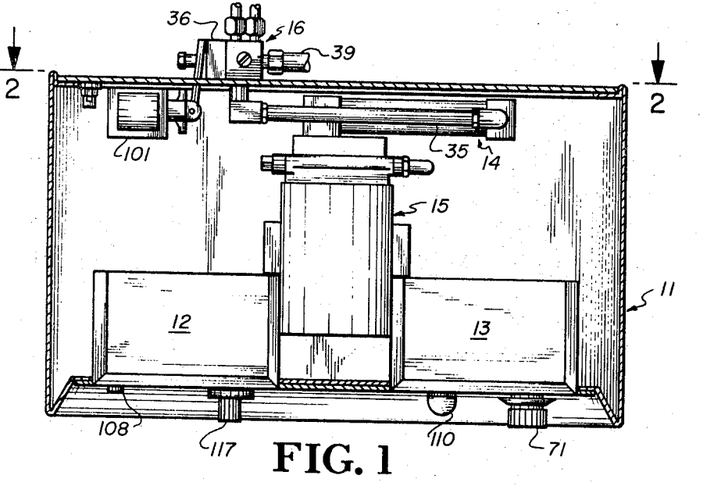
FIG. 1 is a top plan view of our fluid analyzer with the top cover removed therefrom.
Figure 2:
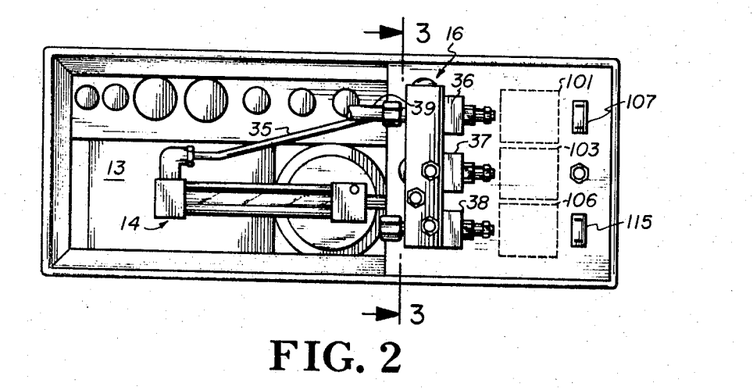
FIG. 2 is a rear elevational view of the fluid analyzer shown in FIG. 1 with the rear cover removed therefrom.
Figure 3:
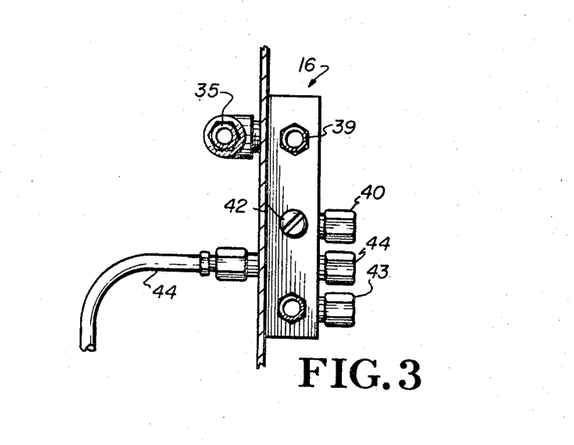
FIG. 3 is an enlarged, side elevational, partially cross-sectional view of a solenoid operated multiple valve manifold taken along line 3—3 in FIG. 2 looking in the direction of the arrows.

Referring now to the drawings in detail, and in particular to FIG. 1, our fluid analyzer comprises a housing 11 enclosing a program control unit 12, a test cell sensitivity and monitor control unit 13, a photo-electrical test cell 14, a pump 15 for circulation of fluid through the test cell 14 and a solenoid operated multiple valve manifold 16 connected to the test cell and mounted on the outside of the rear of the housing 11.

The pump 15 is adapted to draw a sample of fluid from a reservoir, in the embodiment illustrated, a swimming pool, and to circulate it through the photo-sensitive test cell, mixing it with a test reagent therein and analyzing the resultant alteration in light transmitting characeteristics of the mixture by means of a photo-sensitive sensor, thereafter discharging the mixture to some suitable receptacle.

The photo-electrical test cell 14 is illustrated in detail in FIGS. 6, 7, 8 and 9 and comprises a pair of spaced-apart, bored housings 17 and 18. The housings 17 and 18 are rigidly spaced apart by spacing bars 19, 19 extending there-between.

Figure 7:
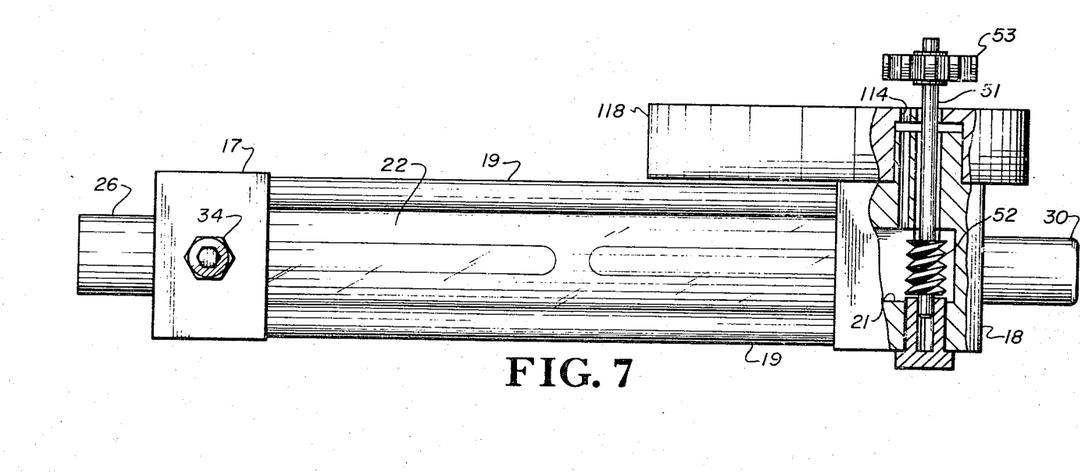
FIG. 7 is an enlarged, partially broken away top plan view of the test cell shown in FIG. 6 illustrating in detail, the drive for the internal cleansing means.
Figure 8:
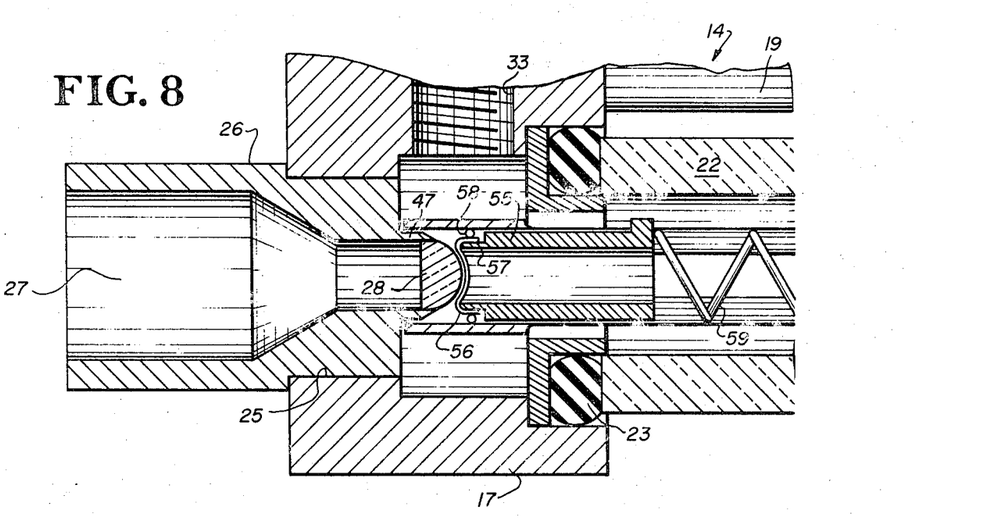
FIG. 8 is an enlarged, side-elevational, cross-sectional veiw of an internal scrubber engaged with one photo-optical surface in the test cell.

The housing 17, illustrated in detail in FIGS. 7 and 8 is provided with a generally axial bore 20. Similarly, housing 18 is provided with a generally axial bore 21. A glass tube 22 extends between the housings 17 and 18, the ends of the tube 22 extending into and seated within the respective bores 20 and 21 through appropriate fluid seals, respectively 23 and 24.

Figure 6:
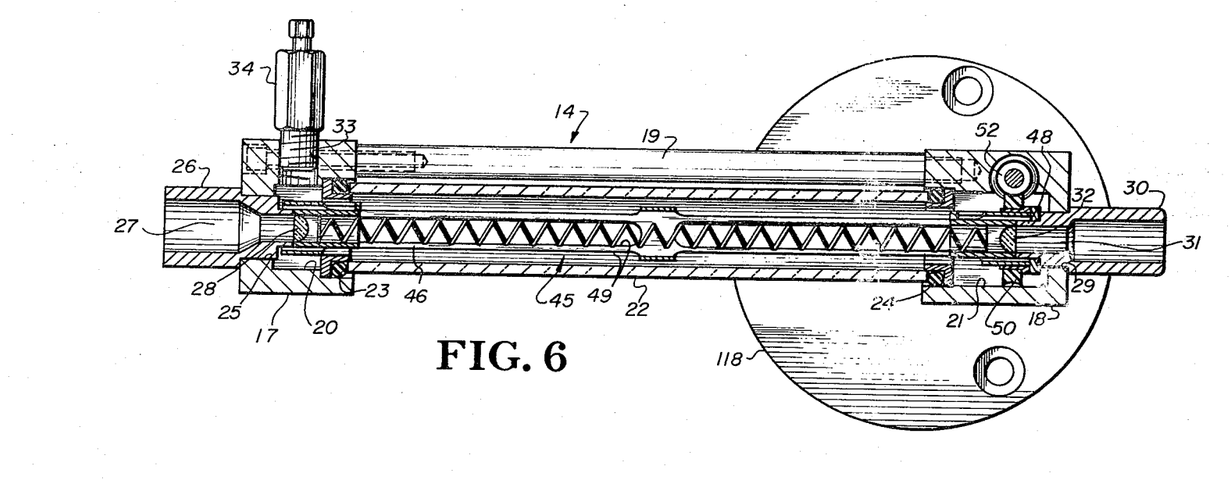
FIG. 6 is an enlarged, side elevational, cross-sectional view of the photo-electrical test cell in our analyzer showing details of internal means for cleansing critical photo-optical surfaces.

The housing 17 is provided with a second bore 25, coaxial with the tube 22 in which a light source housing 26 is seated. A light source 27 is mounted behind the lens 28 in the light source housing 26.

The housing 18 is provided with a second bore 29, coaxial with the tube 22 opposite the end thereof in which a photosensitive sensor housing 30 is mounted.

A signal generating photo-sensitive sensor 31 is seated within the housing 30 behind a lens 32. It should be noted that lenses 28 and 32 project into the opposite ends of the glass tube 22. The bore 21 in housing 18 connects with a passage 114 extending through the housing 18 and a pump cover 118 connecting the pump 15 with the tube 22.

Figure 5:
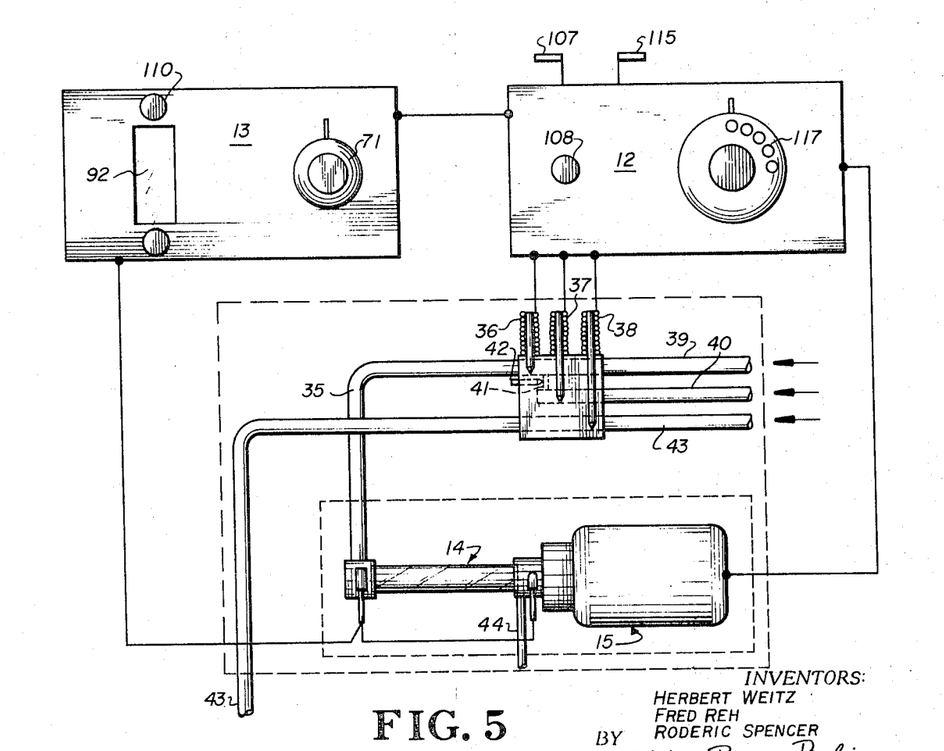
FIG. 5 is a schematic flow diagram of our fluid analyzer illustrating schematically the test cell control unit and the programer control unit.

Housing 17 is also provided with a threaded, radial bore 33 connecting with bore 20. A conduit adaptor 34 is threadably engaged in the radial bore 33 and is adapted to connect a conduit 35 which connects at its opposite end to a multiple valve manifold 16. The multiple valve manifold 16, shown in detail in FIG. 5, is provided with three solenoid operated valves respectively 36, 37 and 38. Valve 36 interconnects conduit 35 with a second conduit 39 extending to a source of fluid to be tested. Valve 37, interconnects conduit 39 and a test reagent supply conduit 40. A test reagent bleed line 41 connects conduit 40 with conduit 39 intermediate valves 36 and 37. Bleed line 41 is provided with a needle valve 42 which is manually adjustable to alter the rate of flow of fluid therethrough.

Valve 38 intercepts conduit 43 extending between a source of make-up chemical, in this case, chlorine and the source from which the test sample is derived.

The high pressure, or outlet side of pump 15 is connected through conduit 44 to a suitable waste reservoir which may conveniently be the source from which the test sample is derived, in this case, the swimming pool. For convenience, conduit 44 passes through multiple valve manifold 16. Multiple valve manifold 16 is provided with suitable couplings for connecting conduits thereto.

The solenoid operated valves 36, 37 and 38 are controlled by electrical solenoids 101, 103 and 106 respectively through conventional mechanical links.

We provide within the test cell 14 an internal, optical surface cleansing assembly 45 illustrated in detail in FIGS. 6 through 12 inclusive. The assembly 45 comprises a slotted drive tube 46 mounted for rotation within the glass tube 22. One end of the drive tube 46 extends into bore 20 of housing 17 and telescopically mates with lip 47 on the end of the light source housing 26. The opposite of the drive tube 46 extends into bore 21 of housing 18 telescopically seating over a similar lip 48 on the photo-sensitive sensor housing 30.

Figure 11:
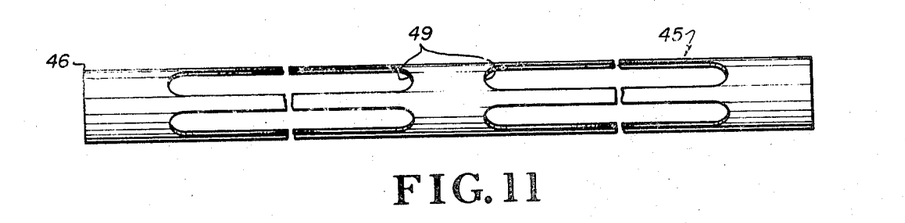
FIG. 11 is an enlarged, side elevational view of a slotted drive tube employed in the internal cleansing means for the test cell.

The diametrically opposed slots 49, 49 of drive tube 46 extend axially thereto into the respective bores 20 and 21 in the housing 17 and 18 thereby providing passage means for fluid in the said housings to flow therefrom into and through the tube 46.

Figure 10:
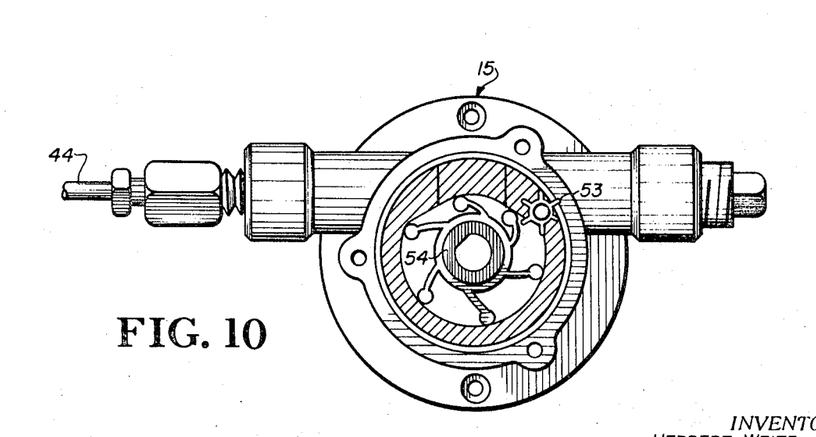
FIG. 10 is an enlarged, end elevational, partially cross-sectional view of the pump and drive take-off for the internal cleansing means.
Figure 12:
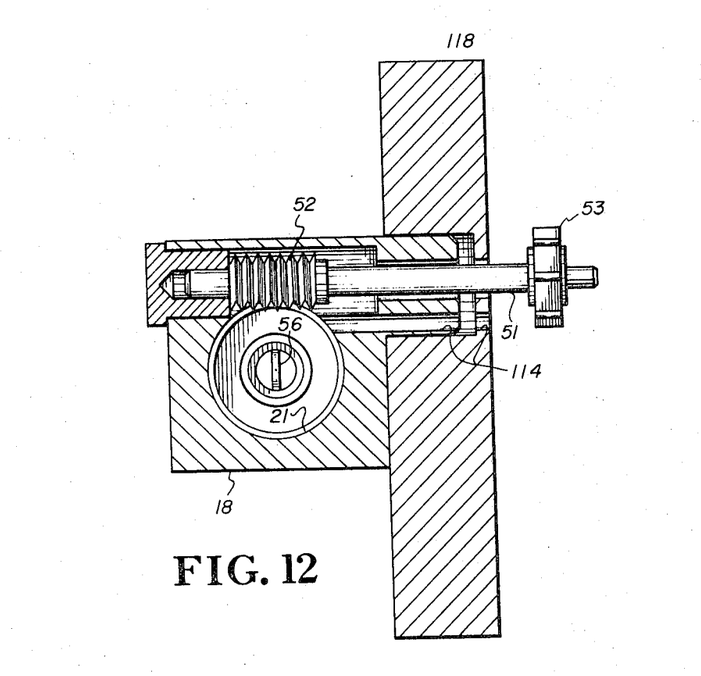
FIG. 12 is a side elevational, partially cross-sectional view of the drive for the internal cleansing means.

The end of drive tube 46 extending into bore 21 of housing 18 is provided with a spur gear 50. A drive shaft 51 is mounted for rotation in the housing 18 and extends from within the bore 21 through the housing 18 to the outside thereof. Drive shaft 51 is provided with a a worm gear 52 within the housing 18 which is engaged to spur gear 50 on the end of drive tube 46. The opposite end of the drive shaft 51 extends beyond the housing 18 into the pump 15. The end of the drive shaft 51 in the pump 15 is provided with a paddle gear 53 which is positioned for engagement with the impeller 54 of the pump 15.

A pair of elongated, spaced apart, annular carriers 55, 55 are telescopically mounted within the drive tube 46 at each end thereof. The carriers 55, 55 are axially slidable in the drive tube 46 and are keyed to the slots 49, 49 for rotation with the tube.

Figure 9:
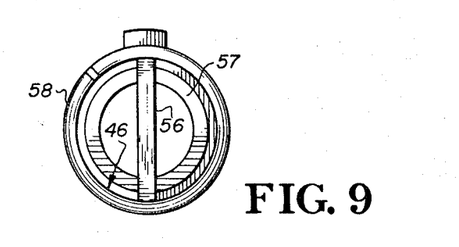
FIG. 9 is an enlarged, end elevational view of the scrubber shown in FIG. 8.

The carriers 55, 55 are spaced apart by a coil spring 59 extending therebetween which normally urges the carriers apart. Each carrier is provided with a flexible filament 56 extending transversely across the end thereof opposite the respective lenses 28 and 32. The coil spring 59 drives the carriers 55, 55 apart with sufficient force to cause the filaments to engage and bend to conform generally with the convex anterior surface of the lenses 28 and 32 respectively. Thus, upon rotation of the drive tube 46 and carriers 55, 55, the filaments 56, 56 function as scrubbers to wipe the lenses clear of deposits.

The drive tube 46 is rotated by means of the pump 15. The impeller 54 rotates paddle gear 53 which in turn drives worm gear 52 through drive shaft 51. Worm gear 52 in turn drives spur gear 50 on the end of the drive tube 46 causing rotation thereof. Obviously, the drive tube rotates only during operation of the pump. However, this is salutary since during operation of the pump, fluid passes through the test cell 14 flushing deposits scrubbed from the lenses 28 and 32 by the filaments 56, 56 out of the test cell 14.

Our fluid analyzer includes a program control system 12 which automatically, periodically causes a fluid test sample to be drawn from the swimming pool, mixed with a test reagent and analyzed for chlorine content.

If the chlorine content is below a pre-determined critical level, our fluid analyzer automatically causes the addition of make-up chlorine until the desired chlorine level is obtained.

The program control unit 12 initiates a test sequence by energizing pump 15 and simultaneously opening valve 36 in manifold 16. Vacuum generated at the inlet side of pump 15 draws fluid from the swimming pool through valve 36 and conduit 35 to the test cell 14. From thence, the fluid flows through the glass tube 22, the test cell 14 to and through the pump 15 to discharge conduit 44.

As the fluid flows through the test cell 14, the drive tube 46 rotates causing the filaments 56, 56 to scrub the lenses 28 and 32, the scrubbed deposit being flushed from the test cell 14. The pump 15 continues to flush the test cell 14 for approximately 35 seconds which is sufficient to replace stagnant fluid in the system and to insure that lenses 28 and 32 are free from light interrupting deposits.

At the conclusion of the flush cycle, valve 37 opens. Since valve 36 remains open and fluid flows through conduits 39 and 35, test reagent is aspirated from conduit 40 through valve 37 and needle valve 42 into the stream of fluid test sample. Of course, the needle valve 42 is adjustable so that the rate of flow of test reagent and hence, its concentration in the fluid test sample may be carefully adjusted.

Valve 37 remains open for approximately three seconds which is sufficient to insure thorough mixing of the proper quantity of test reagent in the test sample. The mixed test sample and test reagent pass into and through tube 22 of test cell 14. Thereupon, both valves 36 and 37 close and pump 15 deenergize simultaneously. The flow of fluid within the glass tube 22 of the test cell 14 terminates and a static condition obtains for a period of approximately three seconds to permit dissipation of bubbles which might produce a false signal readout.

After the three second delay, the program unit generates a readout of the signal from the sensor. In the event that the sensor 31 detects an inadequate chlorine level, valve 38 opens to admit make-up chlorine to the pool through conduit 43. However, if sensor 31 detects an adequate level of chlorine, valve 38 remains closed and, after a delay of approximately two seconds, pump 15 is reenergized and valve 36 opened to flush the mixed test sample and test reagent from the test cell 14 through conduit 44 to a suitable receptacle. Of course, as the pump operates, the lenses 28 and 32 are re-scrubbed and flushed. The flushing cycle continues for approximately ten seconds which not only insures proper cleansing of the said lenses but complete flushing of the system of residual mixed test reagent and test sample.

The test cycle has now been completed and the programer automatically resets itself for the next test cycle, which under normal circumstances for swimming pools, would be pre-set to commence approximately thirty minutes hence.

In the event that make-up chlorine is needed, valve 38 opens and remains open for a predetermined period of time after which it closes. However, circulation of water in the pool is continued until the next regular test period by means which will be hereinafter described in order to insure proper distribution of the chlorine. A re-test will be made at the next regular test cycle and if additional make-up chlorine is needed, the chlorine feed cycle is repeated.

Figure 4:
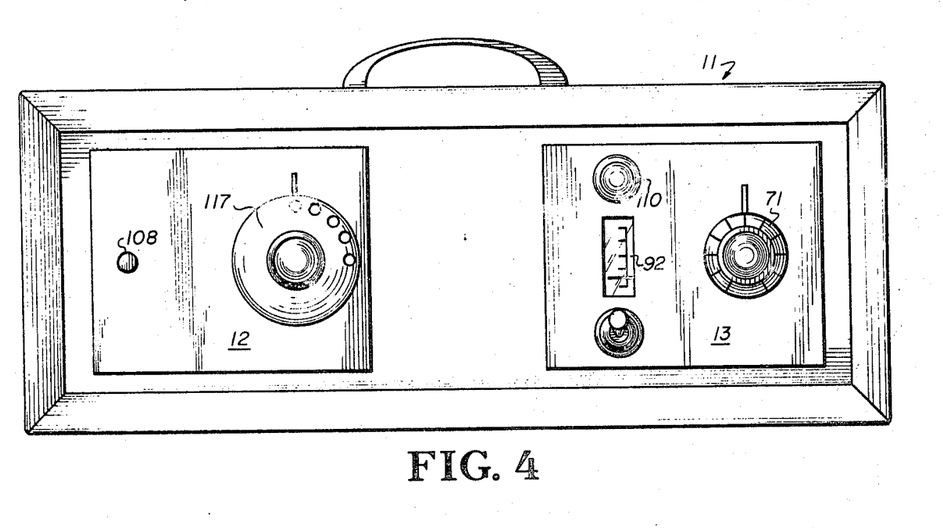
FIG. 4 is a front elevational view of our fluid analyzer illustrating the control panel.

In order to indicate that make-up chlorine is being fed to the pool, a pilot light 110 on the control panel changes from continuous to flashing illumination.

Many swimming pools do not feed chlorine through a suction line but rather employ independent injectors using liquid, gas or dry chlorine or a slurry thereof. Our fluid analyzer includes an electrical receptacle 115 which may be connected to such a remote chlorine feeder. Receptacle 115 energizes the feeder when make-up chlorine is needed.

In addition, in cases where make-up chlorine is fed through conduit 43 directly to the swimming pool, it is necessary to energize the pool filter in order to insure proper distribution of the make-up chlorine. We provide a second electrical receptacle 107 which may be connected to the filtration system of the swimming pool to energize that system for a pre-determined period of time during and after the addition of make-up chlorine.

Figure 13:
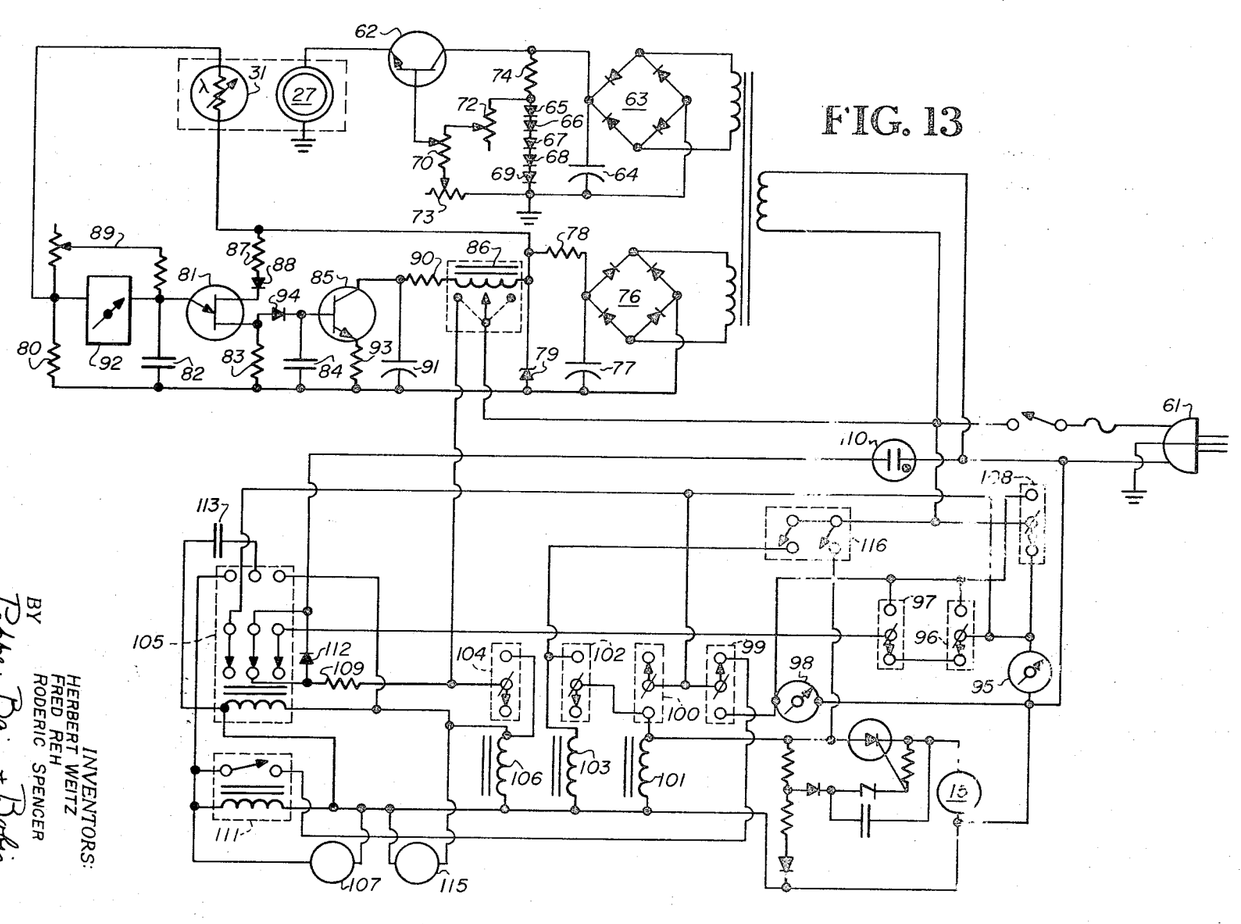
FIG. 13 is a schematic wiring diagram of our fluid analyzer.

A schematic wiring diagram of our fluid analyzer is illustrated in FIG. 13. The wiring diagram may be conveniently divided into a monitor circuit for controlling the sensitivity of the test cell sensor 31 and its response, a regulated power supply for the light source 27 and a program control circuit which dictates the sequence of operation of the analyzer.

Referring now to the schematic wiring diagram specifically, our analyzer employs a source of 110 volts, 60 cycle AC electrical power 61. The power supply for the light source 27 is regulated by a conventional series losser circuit transistor 62 is employed as an emitter-follower configuration to absorb variations in either input voltage or output loading. The power supply from source 61 is rectified by a full wave bridge rectifier 63 and filtered by capacitor 64 to provide unregulated direct current for the regulator circuit.

Silicon diodes 65, 66, 67, 68 and 69 are biased in the forward direction and the resulting drop across the said series of diodes is employed to provide a reference voltage for transistor 62.

Potentiometer 70 is manually adjustable by a front panel dial 71 which permits control of the voltage fed to light source 27 thereby varying light intensity between the limits determined by preset potentiometers 72 and 73.

Resistor 74 limits current flow through diodes 65 through 69 to well below their maximum capability while providing sufficient base drive for transistor 62.

The monitor circuit for the test cell 14 employs the same source of power supply 61. Here again, the power is rectified by full wave bridge rectifier 76 and filtered by capacitor 77. The current is limited by resistor 78 and stabilized by Zener diode 79 which is employed as a shunt regulator and is adequate for the power drain of the monitor circuit.

The base reference of the monitor circuit is a bridge consisting of the sensor 31 and resistor 80 on one side and a unijunction transistor 81 on the opposite side. The unijunction transistor 81 will not conduct so long as the emitter voltage is below the peak point which is a function of the intrinsic stand-off ratio of the particular unijunction transistor employed.

In the circuit illustrated in FIG. 13, capacitor 82 and other circuit components form a relaxation oscillator. Resistor 83 is employed so that when unijunction oscillator 81 oscillates, output pulses developed across resistor 83 are available to charge capacitor 84 thereby causing transistor 85 to conduct. This in turn energizes relay 86.

Resistor 87 and diode 88 are employed for temperature compensation of the unijunction transistor 81. Potentiometer 89 is a pre-set meter calibration potentiometer. Resistor 90 limits the current of relay 86. Capacitor 91 filters the output of transistor 85 in order to increase the sensitivity of relay 86.

The monitor circuit functions in the following manner. When a relatively clear fluid test sample such as water from a swimming pool is passed through the test cell 14 without any test reagent, the sensor 31 receives light from the light source 27 with the greatest operating intensity. This decreases the output value of sensor 31 with the result that the unijunction transistor 81 oscillates. This will be indicated by a minimum reading on meter 92 on the control panel. In order to calibrate the meter 92 and hence, the sensitivity of our analyzer, light source 27 is brightened by manipulation of knob 71 controlling potentiometer 70 until the meter 92 lies at approximately mid-scale.

The reading of meter 92 is related to the unbalance of the bridge; thus, the higher the meter reading, the greater degree of bridge unbalance.

When test reagent is bled into the test sample, a color change occurs in the mixture. In the case of a test for chlorine, in swimming pool water, the color change diminishes the amount of light transmitted through the test cell 14 from the light source 27 to the sensor 31. When less light reaches the sensor 31, its resistance increases. If the mixture of test sample and test reagent is sufficiently opaque, sensor 31 resistance will increase to or above the bridge balance point, turning off unijunction transistor 81 and transistor 83 which in turn deenergizes relay 86. In the event that the mixture in the test cell 14 does not produce a sufficient diminution in light transmission, the resistance of sensor 31 will not increase sufficiently to balance the bridge. Unijunction transistor 81 will thereupon continue to oscillate, transistor 83 will remain conductive and relay 86 will remain closed.

When testing for chlorine in swimming pool water, a sufficient level of chlorine is determined by a diminution of light transmission sufficient to deenergize relay 86. However, it is apparent that by pre-adjusting potentiometer 70, relay 86 can be made to open at virtually any desired degree of opacity of the test mixture.

The circuit is particularly immune to false triggering from line transients because of the fact that a selected minimum number of discreet pulses in a given time interval are required to effect triggering.

The transistor 85 is employed as a common emitter amplifier with an unbypassed emitter resistor 93. While resistor 93 introduces some degeneration, the loss of amplifier gain is more than compensated for by the boost in input impedance. Input impedance is increased from approximately 1500 ohms to over 100,00 ohms. Thus, the loading effect of transistor 85 on the output of unijunction transistor 81 is virtually eliminated. The "go-no-go" hysteresis is held to approximately 0.1% at the balance point.

Diode 94 and capacitor 84 function to convert the output pulses from unijunction transistor 81 to a DC signal for transistor 85 to amplify.

The program control unit 12 governs the time interval of chlorine feed between test cycles and the sequence of operation of the analyzer during each test cycle. The programer control unit comprises a timer motor 95 which is adapted to close microswitches 96 and 97 during each full revolution thereof. The particular construction of the timer motor is not critical to invention and may conveniently employ rotating cams mechanically engagable to the micro-switches. In a typical test cycle, the timer motor 95 completes one revolution every thirty minutes although this time period may be varied by altering the timer motor.

The closing of micro-switch 96 supplies power to a second timer motor 98 which undergoes one complete revolution every minute. Micro-switch 99 closes simultaneously and thereafter timer motor 98 receives its power through micro-switch 99 and is no longer dependent upon micro-switch 96 which then opens.

Micro-switch 100 then closes which energizes pump 15 as well as solenoid 101 controlling fluid sample inlet valve 36. The pump 15 remains energized and the valve 36 remains open for approximately 35 seconds after which time micro-switch 102 closes energizing solenoid 103 and opening test reagent valve 37.

After approximately three seconds, micro-switch 100 opens, deenergizing pump 15 and solenoids 101 and 103. Thus, valves 36 and 37 close and fluid flow terminates within the test cell 14. It should be noted that solenoid 103 controlling test reagent inlet valve 37 requires that both micro-switches 100 and 102 be closed. Micro-switch 102 opens shortly after micro-switch 100 opens. A two second delay following the opening of micro-switch 100 closes micro-switch 104 thereby completing the circuit between relay 105 and the normally open contact of relay 86 in the monitor circuit.

If the test mixture is sufficiently opaque to the transmission of light, relay 86 will open and no power will be supplied to relay 105 or solenoid 106 controlling valve 38 for the supply of make-up chlorine. However, if the test fluid in the test cell 14 is not sufficiently opaque, relay 86 will remain closed and, after micro-switch 104 closes, relay 105 will be energized and will close and hold itself closed through its own contact. As long as relay 105 remains energized, solenoid 106 controlling make-up chlorine valve 38 will remain energized. In addition, an auxiliary outlet socket 107 will be energized for controlling auxiliary equipment such as pool's filtration system.

Under the control of timer 98, micro-switch 104 opens and micro-switch 100 closes for a period of approximately ten seconds during which time, make-up chlorine is fed to the swimming pool. Here, the time for feed of make-up chlorine may be altered by the operator. Thereafter, micro-switch 100 reopens and shortly thereafter timer motor 98 completes one revolution and opens micro-switch 99 deenergizing timer motor 98. This completes one test cycle.

It is desirable to provide means whereby the operator may manually override the normal program timer to initiate a test cycle at will. Switch 108 is employed to override micro-switch 96. By closing switch 108 and holding it closed until timer motor 98 is energized, a test cycle may be so initiated manually.

We have provided a second, manually operated switch 116 which overrides micro-switches 100 and 102. Switch 116 is employed only for the initial adjustment of the needle valve 42 controlling the rate of supply of test reagent.

In addition, the pump 15 is provided with a speed reducing circuit for lowering the operating speed of its motor thereby guaranteeing optimum efficiency with reduced wear.

Our analyzer is provided with neon pilot light 110 which is continuously illuminated during normal operation of the analyzer. However, during periods wherein make-up chlorine is being fed to the pool, the neon pilot light 110 changes to a flasher.

Relay 105 controls the make-up chemical feed valve 38 and the neon lamp 110 in the control panel. When relay 105 is opened 110 volt 60 cycle AC power is fed through resistor 109 to the indicator lamp 110. Thus, lamp 110 remains continuously illuminated. However, if power is momentarily supplied to relay 105, it will close and hold itself closed with power delivered to it through its own contacts and micro-switch 97. In turn, power will be supplied to solenoid 106 controlling make-up chemical feed valve 38. Power is also supplied to an adjustable timed outlet through relay 111 which deprives the neon light 110 of full wave power replacing it with half wave power through diode 112. The neon pilot light 110 is then shunted by capacitor 113 which is charged to the breakdown voltage of neon light 110 before it is illuminated. When neon light 110 is illuminated, it discharges capacitor 113 and is then extinguished.

The value of resistor 109 is selected such that the pilot light 110 is illuminated and extinguished about three times per second producing a flashing effect which is an indication that make-up chlorine valve 38 is in the open position and that remote outlets 107 and 115 are energized.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:

1. A fluid analyzer comprising,
   (a) a photo-electrical test cell defined by a chamber for the passage of fluid between a light source and a signal generating photo-electrical sensor positioned in light intercepting relation to the light source,
   (b) the sensor generating a signal response to variations in the optical characteristics of the fluid between it and the light source,
   (c) means for introducing a fluid test sample into the test cell,
   (d) means for mixing a test reagent with the test sample in the test cell,
   (e) means for sampling a readout signal from the sensor after mixture of the test sample and test reagent in the test cell,
   (f) response means operatively connected to and controlled by the readout signal from the sensor,
   (g) cleansing means within the test cell in wiping contact with all photo-optical surfaces in contact with the fluid and operable from without the test cell,
   (h) means for discharging the mixed fluid test sample and test reagent from the test cell after sensor signal readout, and
   (i) drive means operatively connected to the said cleansing means, the drive means being operatively connected to and driven by the means for introducing and discharging fluid through the test cell.

2. A fluid analyzer comprising,
   (a) the system in accordance with claim 1, and,
   (b) drive means operatively connected to the cleansing means from outside of the test cell, and
   (c) pump means operatively connected to the means for introducing and discharging fluid to and from the test cell, the said drive means being operatively connected to and driven by the said pump means.

3. A fluid analyzer comprising,
   (a) the system in accordance with claim 1 and,
   (b) means for adjustably controlling the interaction of the sensor and response means so that the response means will react only to an adjustably predetermined optical characteristic of the fluid in the test cell.

4. A fluid analyzer comprising,
   (a) the system in accordance with claim 1 and,
   (b) means for adjustably controlling the amount of test reagent mixed with the fluid test sample in the test cell during readout.

5. A fluid analyzer comprising,
   (a) the system in accordance with claim 1 and,
   (b) means for terminating the flow of fluid through the test cell for a predetermined period of time before signal readout.

6. A fluid analyzer comprising,
   (a) the system in accordance with claim 1 and,
   (b) program control means for periodically automatically re-initiating the sequence of passage of a new fluid test sample into the test cell, mixing test reagent therewith, sampling the readout signal and discharging the said mixture after signal readout.

7. A fluid analyzer comprising,
   (a) the system in accordance with claim 1 and,
   (b) at least one signal transmission contact for attachment and control of satellite equipment, said contact being operatively interconnected to and actuated in response to a predetermined signal from the sensor.

8. A fluid analyzer comprising,
   (a) the system in accordance with claim 1, and
   (b) valve means connected to the said means for introducing a fluid test sample into the test cell,
   (c) programmed control means operatively connected to and controlling the valve means, the said control means operating the valve means to pass a flushing stream of fluid through the test cell after said sampling of the readout signal.

9. A fluid analyzer comprising,
   (a) the system in accordance with claim 1,
   (b) program control means for automatically periodically initiating the sequence of
   (c) introducing a fluid test sample into the test cell,
   (d) mixing the test reagent with the fluid test sample and,
   (e) sampling the readout signal from the sensor.

10. A fluid analyzer comprising,
    (a) the system in accordance with claim 9,
    (b) manually operable means for overriding the said program control means to initiate the said sequence at will.

11. A fluid analyzer comprising,
    (a) the system in accordance with claim 1 in which,
    (b) the response means are means for introducing a predetermined quantity of material into the source from which the fluid test sample was taken, the said material being introduced only if a predetermined signal characteristic is generated by the sensor.

12. A fluid analyzer comprising,
    (a) the system in accordance with claim 11 and,
    (b) means operatively connected to the response means for generating a signal to satellite equipment whereby said satellite equipment is energized for a predetermined period of time after actuation of the response means.

13. A fluid analyzer comprising,
    (a) the system in accordance with claim 1 in which,
    (b) the test cell is an axially elongated hollow cylinder with the light source at one end and the sensor at the opposite end and,
    (c) the cleansing means are a pair of rotatable annular carriers positioned adjacent to the optical surfaces of the light source and sensor respectively,
    (d) a flexible filament affixed to and extending across the end of each carrier opposite the respective optical surfaces, the filaments being engaged with the respective optical surfaces,
    (e) resilient means normally urging the filaments into engagement with the said optical surfaces, and,
    (f) means for rotating the carriers.

14. A fluid analyzer comprising,
    (a) the system in accordance with claim 13 in which,
    (b) the carriers are rotated by the means for passing the fluid test sample through the test cell.

15. A fluid analyzer comprising,
    (a) the system in accordance with claim 13 and,
    (b) an elongated hollow drive tube seated in the hollow cylinder, the carriers being mounted in the opposite ends of and for rotation with the drive tube, and
    (c) means for rotating the drive tube.

16. A fluid analyzer comprising,
    (a) the system in accordance with claim 15 and,
    (b) a spur gear mounted in the drive tube, and
    (c) means for rotating the spur gear.

17. A fluid analyzer comprising,
(a) the system in accordance with claim 15 in which,
(b) the means for passing the fluid test sample into the test cell is a pump and,
(c) the said pump is operably interconnected to and rotates the drive tube.

18. A fluid analyzer comprising,
(a) the system in accordance with claim 15 and,
(b) a hollow housing having a bore, therein on at least one end of the cylinder, the drive tube extending into the said bore,
(c) a spur gear on the drive tube in the bore in the housing,
(d) a drive shaft extending into the bore in the housing from without the housing,
(e) a gear on the drive shaft in the bore in the housing meshed with the gear on drive tube, and
(f) means for rotating the drive shaft from without the housing.

19. A fluid analyzer comprising,
(a) the system in accordance with claim 18 in which,
(b) the means for passing the fluid test sample into the test cell is a pump and,
(c) the said pump is operably connected to and drives the drive shaft from without the housing.

20. A fluid analyzer comprising,
(a) the system in accordance with claim 1 in which the means for introducing a fluid test sample into the test cell are,
(b) a pump connected to the test cell for inducing a flow of fluid to be tested from a source to the cell through a first conduit,
(c) a normally closed first valve in the first conduit and,
(d) means for opening the first valve upon energizing the pump.

21. A fluid analyzer comprising,
(a) the system in accordance with claim 20 in which the means for mixing a test reagent with the fluid sample are,
(b) a second conduit connecting a source of test reagent with the first said conduit, the second conduit being connected to the first conduit in such a manner that vacuum in the first conduit aspirates test reagent from the second conduit into the first conduit through a second valve.

22. A fluid analyzer comprising,
(a) the system in accordance with claim 21 and,
(b) program control means operatively connected to the pump and first and second valves,
(c) the control means periodically automatically initiating a test sequence by energizing the pump and opening the first valve for a predetermined period of time,
(d) thereafter opening the second valve for a predetermined period of time,
(e) thereafter deenergizing the pump to terminate fluid flow through the test cell and closing at least the second valve,
(f) thereafter sampling the readout signal from the sensor after the termination of said fluid flow and,
(g) thereafter reenergizing the pump and reopening the first valve for a predetermined period of time to pass fluid through the test cell.

23. A fluid analyzer comprising,
(a) the system in accordance with claim 22 and,
(b) means operably connected to the sensor for introducing a predetermined amount of a material into the source from which the fluid test sample is derived in response to a predetermined initiating readout signal characteristic.

24. A fluid analyzer comprising,
(a) the system in accordance with claim 23 in which,
(b) the said control means periodically initiates the said test sequence whereby the said means operatively connected to the sensor for introducing a predetermined amount of material into the source from which the flour sample was derived is energized during each test cycle in response to a predetermined initiating readout signal characteristic from the sensor.

25. A fluid analyzer comprising,
(a) the system in accordance with claim 1 and,
(b) program control means operatively interconnecting the sensor, the means for introducing the fluid test sample into the test cell and the means for introducing the test reagent into the test sample, said control means periodically automatically initiating a test sequence by,
(c) energizing the means for introducing a fluid test sample into the test cell and passing the same therethrough for a predetermined period of time,
(d) thereafter energizing the means for mixing the test reagent with the test sample to pass a mixture of the same through the test cell for a predetermined period of time,
(e) thereafter deenergizing the means for introducing and passing the mixed test sample and test reagent through the test cell to terminate the flow of fluid through the test cell for a predetermined period of time,
(f) thereafter sampling the readout signal from the sensor,
(g) thereafter reenergizing the means for introducing the fluid test sample into the test cell and to pass the said fluid through the test cell for a predetermined period of time.

26. A fluid analyzer comprising,
(a) the system in accordance with claim 25 and,
(b) means operatively connected to the sensor for introducing a predetermined amount of a material into the source from which the fluid test sample is derived in response to a predetermined initiating readout signal characteristic.

27. A fluid analyzer comprising,
(a) the system in accordance with claim 26 in which,
(b) the said control means periodically initiates the said test sequence whereby the said means operatively connected to the sensor for introducing a predetermined amount of material into the source from which the fluid sample was derived is energized during each test cycle in response to a predetermined initiating readout signal characteristic from the sensor.

28. A fluid analyzer comprising,
(a) a photo-electrical test cell defined by a chamber for the passage of fluid between a light source and a signal generating photo-electrical sensor positioned in light intercepting relation to the light source,
(b) the sensor generating a signal responsive to variations in the optical characteristics of the fluid between it and the light source,
(c) means for introducing a fluid test sample into the test cell,
(d) means for sampling a readout signal from the sensor after introduction of the fluid test sample into the test cell,
(e) response means operatively connected to and controlled by the readout signal from the sensor,
(f) cleansing means within the test cell in wiping contact with all photo-optical surfaces in contact with the fluid and operable from without the test cell,
(g) means for discharging the fluid test sample from the test cell after sensor signal readout, and
(h) drive means operatively connected to the said cleansing means, the drive means being operatively connected to and driven by the means for introducing and discharging fluid to and from the test cell.

29. A fluid analyzer comprising,
(a) the system in accordance with claim 28 in which, (b) the test cell is an axially elongated hollow cylinder with the light source at one end and the sensor at the opposite end, and (c) the cleansing means are a pair of rotatable annular carriers positioned adjacent to the optical surfaces of the light source and sensor respectively, (d) a flexible filament affixed to and extending across the end of each carrier opposite the respective optical surfaces, the filaments being engaged with the respective optical surfaces, (e) resilient means normally urging the filaments into engagement with said optical surfaces, and (f) means for rotating the carriers.

30. A fluid analyzer comprising, (a) the system in accordance with claim 29 in which, (b) the carriers are rotated by the means for passing the fluid test sample through the test cell.

31. A fluid analyzer comprising, (a) the system in accordance with claim 30 and, (b) an elongated hollow drive tube seated in the hollow cylinder, the carriers being mounted in the opposite ends of and for rotation with the drive tube, and (c) means for rotating the drive tube.

32. A fluid analyzer comprising, (a) the system in accordance with claim 31 and, (b) a housing having a bore therein at at least one end of the cylinder, the drive tube extending into the bore, (c) a spur gear on the drive tube in the bore in the housing, (d) a drive shaft extending into the bore in the housing from without the housing, (e) a gear on the drive shaft into the bore in the housing meshed with the gear on the drive tube, and (f) means for rotating the drive shaft from without the housing.

References Cited

UNITED STATES PATENTS

| | | | |
|---|---|---|---|
| 1,471,342 | 10/1923 | Logan | 23—253 |
| 1,937,721 | 12/1933 | Simon et al. | 250—43X |
| 1,937,722 | 12/1933 | Simon et al. | 250—239X |
| 1,960,615 | 5/1934 | Baker | 250—218X |
| 2,063,140 | 12/1936 | Allison | 23—253X |
| 2,977,199 | 3/1961 | Quittner | 23—253X |
| 3,019,091 | 1/1962 | Schneider | 23—253 |
| 3,028,225 | 4/1962 | Sheen | 356—181X |
| 3,186,799 | 6/1965 | Hach | 23—253 |
| 3,226,195 | 12/1965 | Nichols et al. | 23—253X |
| 3,422,271 | 1/1969 | Fuhrmann | 23—253X |

JOSEPH SCOVRONEK, Primary Examiner

D. G. MILLMAN, Assistant Examiner

U.S. Cl. X.R.

250—218; 356—181, 208